United States Patent
Shimotsu

(10) Patent No.: US 9,961,232 B2
(45) Date of Patent: May 1, 2018

(54) IMAGE FORMING DEVICE HAVING DIFFERENT WAYS OF STORING PREVIEW DATA

(71) Applicant: KYOCERA Document Solutions Inc., Osaka (JP)

(72) Inventor: Yuki Shimotsu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days. days.

(21) Appl. No.: 15/308,083

(22) PCT Filed: Mar. 6, 2016

(86) PCT No.: PCT/JP2016/058219
§ 371 (c)(1),
(2) Date: Oct. 31, 2016

(87) PCT Pub. No.: WO2017/002408
PCT Pub. Date: Jan. 5, 2017

(65) Prior Publication Data
US 2017/0264774 A1 Sep. 14, 2017

(30) Foreign Application Priority Data
Jun. 30, 2015 (JP) .................................. 2015-130901

(51) Int. Cl.
*G06F 3/12* (2006.01)
*H04N 1/00* (2006.01)
*H04N 1/32* (2006.01)
*H04N 1/21* (2006.01)

(52) U.S. Cl.
CPC ......... *H04N 1/3239* (2013.01); *H04N 1/0044* (2013.01); *H04N 1/2158* (2013.01); *H04N 2201/0094* (2013.01); *H04N 2201/216* (2013.01); *H04N 2201/3298* (2013.01)

(58) Field of Classification Search
CPC .. H04N 1/3239; H04N 1/0044; H04N 1/2158; H04N 2201/216; H04N 2201/3298
USPC .................................................. 358/1.1–1.18
See application file for complete search history.

(56) References Cited

U.S. PATENT DOCUMENTS

| | | | |
|---|---|---|---|
| 8,515,963 B1* | 8/2013 | Blank, Jr. ......... | G06F 17/30864 707/741 |
| 8,792,114 B2* | 7/2014 | Stewart ............ | H04L 29/08846 358/1.13 |
| 9,609,153 B2* | 3/2017 | Haginoya ............ | H04N 1/0044 |
| 2008/0201378 A1* | 8/2008 | Nagahara ........... | H04N 1/00411 |

(Continued)

FOREIGN PATENT DOCUMENTS

| JP | 2012-168982 A | 9/2012 |
|---|---|---|
| JP | 2014-123317 A | 7/2014 |

Primary Examiner — Gabriel Garcia
(74) Attorney, Agent, or Firm — Hawaii Patent Services; Nathaniel K. Fedde; Kenton N. Fedde

(57) ABSTRACT

To provide an image forming device (20) able to perform an appropriate preview. A MFP (20) that generates an output image (27a) for at least one of transmission and printing (S102) and executes an output using an output image (27a) generated in S102. The MFP (20) generates a preview image (27b) for preview of the output image (27a), stores the preview image (27b) generated in S104 in a storage medium (30) outside of the MFP (20), and performs a preview using the preview image (27b) stored in the storage medium (30) in S109 (S111).

7 Claims, 11 Drawing Sheets

(56) References Cited

U.S. PATENT DOCUMENTS

2011/0292444 A1* 12/2011 Koarai .................. G06F 3/1208
358/1.15
2013/0003105 A1* 1/2013 Yamada ............. G06K 15/1859
358/1.14

* cited by examiner

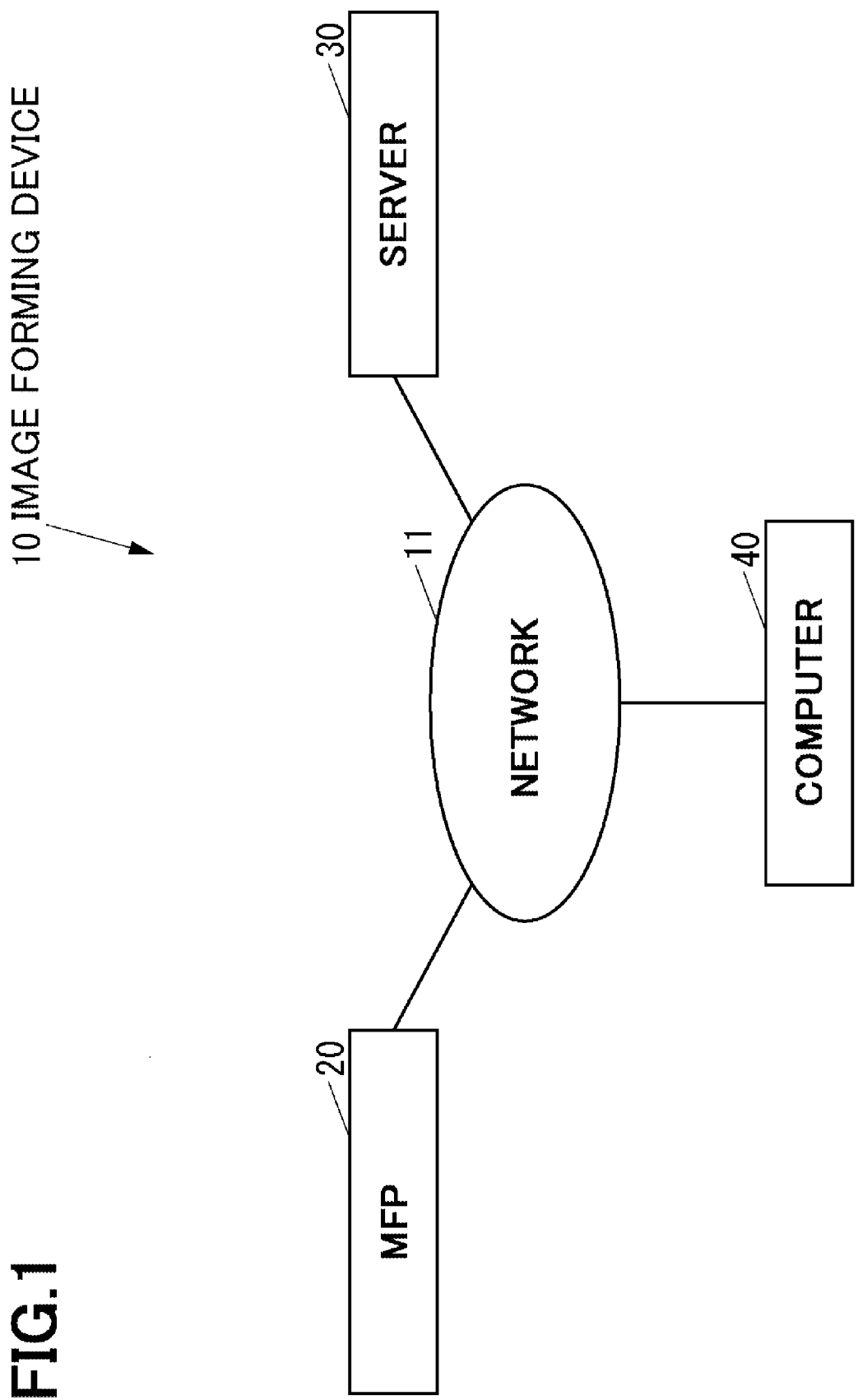

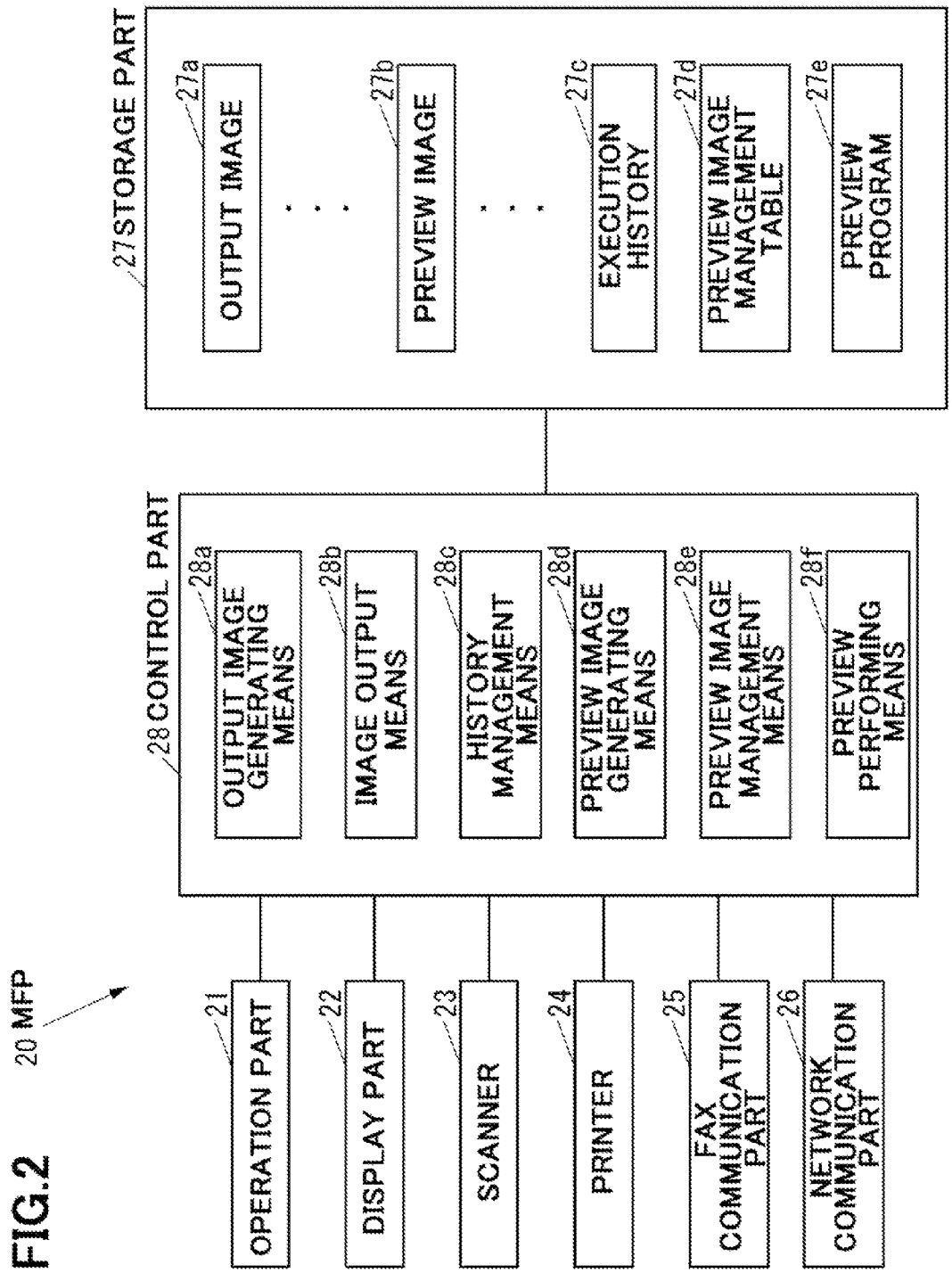

FIG.3    27c EXECUTION HISTORY

| JOB ID | TYPE | DATE AND TIME | USER ID | ⋮ |
|---|---|---|---|---|
| JOB001 | COPY | MAY 29,2015 15:40 | USER 001 | ⋮ |
| JOB002 | PRINT | MAY 29,2015 15:45 | USER 002 | ⋮ |
| JOB003 | TRANSMISSION | MAY 29,2015 15:52 | USER 003 | ⋮ |
| ⋮ | ⋮ | ⋮ | ⋮ | ⋮ |

FIG.9

JOB HISTORY

| TYPE | DATE AND TIME | |
|---|---|---|
| COPY | MAY 29, 2015 15:40 | PREVIEW |
| TRANSMISSION | MAY 29, 2015 16:50 | PREVIEW |
| PRINT | MAY 29, 2015 16:52 | PREVIEW |

50

51

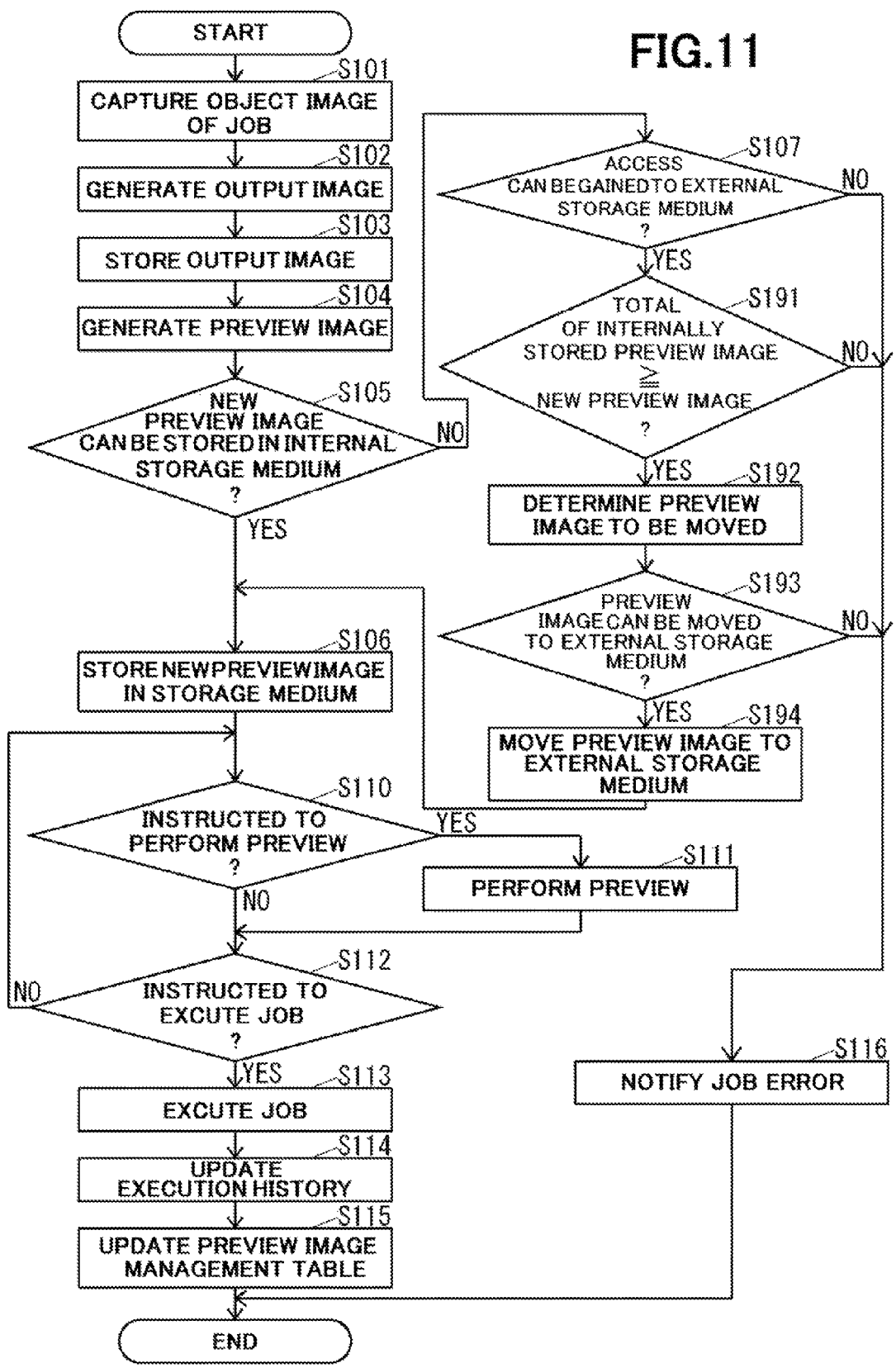

IMAGE FORMING DEVICE HAVING DIFFERENT WAYS OF STORING PREVIEW DATA

FIELD OF THE INVENTION

The present invention relates to an image forming device that performs a preview of an output image for output of at least one of transmission and printing.

Conventionally, there has been known an image forming device that performs transmission using an output image, in which the output image is stored in a storage medium inside of the image forming device (e.g., see Patent Literature 1).

Further, there has been known a method of performing a preview of an output image using a preview image for preview of the output image (e.g., see Patent Literature 2).

PRIOR ART DOCUMENT

Patent Literature

Patent Literature 1: JP 2014-123317 A
Patent Literature 2: JP 2012-168982 A

SUMMARY OF THE INVENTION

Problem to be Solved by the Invention

It is presumed that an image forming device disclosed in the Patent Literature 1 stores a preview image in a storage medium inside of the image forming device, as with an output image in a case where the preview image is generated and stored just like a technology disclosed in the Patent Literature 2. Here, because the preview image is an image having high resolution to cope with an enlarged display at the time of a preview, it is often the case that a data size is larger than that of the output image. Thus, it is likely that when a preview image is generated and stored, the image forming device disclosed in the Patent Literature 1 becomes less able to store the preview image in a storage medium inside of the image forming device due to a too large data size of the preview image. The image forming device disclosed in the Patent Literature 1 cannot display a preview when the preview image is unable to be stored in the storage medium inside of the image forming device.

An object of the present invention is to provide an image forming device able to perform an appropriate preview.

Means for Solving the Problem

An image forming device according to the present invention includes an output image generating part that generates an output image for output of at least one of transmission and printing; an image output part that executes the output using the output image generated by the output image generating part; a preview image generating part that generates a preview image for preview of the output image; a preview image management part that stores the preview image generated by the preview image generating part in a storage medium; and a preview performing part that performs the preview using the preview image stored in the storage medium, wherein the preview image management part stores the preview image in the storage medium outside of the image forming device.

With this configuration, the image forming device according to the present invention enables the preview image to be stored in the storage medium outside of the image forming device. Thus, even if a data size of the preview image is larger to the extent that the preview image becomes less able to store in the storage medium inside of the image forming device, the image forming device can store the preview image in the storage medium. Accordingly, the image forming device according to the present invention enables execution of a preview appropriately.

Effects of the Invention

According to the present invention, the invention enables execution of a preview appropriately.

BRIEF DESCRIPTION OF THE DRAWINGS

FIG. 1 is a system block diagram of an image forming system according to one embodiment of the present invention.
FIG. 2 is a block diagram of a MFP shown in FIG. 1.
FIG. 3 is a view showing an example of an execution history shown in FIG. 2.
FIG. 9 is a view showing an example of a history screen to be displayed in processing shown in FIG. 8.
FIG. 11 is a flowchart of an operation of the MFP shown in FIG. 2 in a case where an output job of an image is executed, which shows a different example than those shown in FIG. 7 and FIG. 10.

MODES FOR CARRYING OUT THE INVENTION

Figure 4:
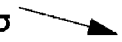
FIG. 4 is a view showing an example of a preview image management table shown in FIG. 2.

Hereinafter, a description will be given to one embodiment of the present invention with reference to the accompanying drawings.

First of all, a description will be given to a configuration of an image forming system according to the present embodiment.

FIG. 1 is a block diagram of an image forming system 10 according to the present embodiment.

As shown in FIG. 1, the image forming system 10 includes a MFP (Multifunction Peripheral) 20 as an image forming device, a server 30 as a storage medium outside of the MFP 20, and a computer 40 such as a PC (Personal Computer) and a smartphone. The MFP 20 and the server 30 are communicable via a network 11 such as a LAN (Local Area Network) and an Internet. Further, the MFP 20 and the computer 40 are communicable via the network 11.

FIG. 2 is a block diagram of the MFP 20.

As shown in FIG. 2, the MFP 20 includes an operation part 21 that is an input device such as a button by which various operations are input, a display part 22 that is a display device such as a LCD (Liquid Crystal Display) to display various information, a scanner 23 that is a reading device to read an image from a document, a printer 24 that is a printing device to perform printing on a recording medium such as a paper, a fax communication part 25 that is a fax device to perform communication with an external facsimile device (not shown) via a communication line such as a public communication line, a network communication part 26 that is a communication device to perform communication with an external device via the network 11 (see FIG. 1), a semiconductor memory to store various information, a storage part 27 that is an nonvolatile memory device such as a HDD (Hard Disk Drive), and a control part 28 to control the whole MFP 20.

The storage part 27 can store plural images composed of an output image 27a for output of at least one of transmission or printing and a preview image 27b for preview of the output image 27a. The MFP 20 is capable of executing many times an output based on the output image 27a by storing the output image 27a in the storage part 27.

Further, the storage part 27 can store an execution history 27c of an output job of at least one of transmission or printing and a preview image management table 27d associating a preview image with a job in the execution history 27c.

The storage part 27 stores a preview program 27e to perform a preview. The preview program 27e may be installed in the MFP 20 at a manufacturing stage of the MFP 20, additionally installed in the MFP 20 from an external storage medium such as a SD card and a USB (Universal Serial Bus) memory, or additionally installed in the MFP 20 over the network 11.

The control part 28 includes, for example, a CPU (Central Processing Unit), a ROM (Read Only Memory) in which a program and data are stored, and a RAM (Random Access Memory) for use as a work area of the CPU. The CPU executes the program stored in the ROM or the storage part 27.

The control part 28 functions as an output image generating means 28a for generating an output image, an image output means 28b for executing an output using the output image generated by the output image generating means 28a, and history management means 28c for managing the execution history 27c of an output job by the image output means 28b by executing the program stored in the ROM or the storage part 27.

Also, the control part 28 functions as preview image generating means 28d for generating a preview image, preview image managing means 28e for storing the preview image generated by the preview image generating means 28d in a storage medium, and preview executing means 28f for executing a preview using the preview image stored in the memory medium by executing the preview program 27e stored in the control part 27.

FIG. 3 is a view showing an example of the execution history 27c.

As shown in FIG. 3, the execution history 27c contains, for each job, various information such as a job ID as identification information of an output job, a type of the output job, date and time of the output job, and a user ID as identification information of a user who executed the output job.

As an example of the type of the output job, there exists "copy" to print by the printer 24 an image read from a document by the scanner 23, "print" to print by the printer 24 an image based on print data received by the network communication part 26, or an image read from an external storage medium such as the SD card, the USB memory and the storage part 27, and a "transmission" to transmit to the outside an image read from a document by the scanner 23, an image received by the network communication part 26, an image received through the network communication part 26, and an image read from the external memory such as the SD card and the USB memory and from the storage part 27.

For example, in the execution history 27c shown in FIG. 3, a job having a job ID "JOB001" is a copying job executed by a user having a user ID "USER001" at 15:40 on May 29, 2015.

FIG. 4 is a view showing an example of the preview image management table 27d.

As shown in FIG. 4, the preview image management table 27d includes, for each preview image, various information containing a path indicating a location where a preview image is stored and a job ID of a job with which the preview image is associated.

For example, in the preview image management table 27d shown in FIG. 4, a preview image associated with the job having the job ID "JOB001" is stored in a folder"USER001" of the MFP 20 named "xxx, JPEG". Further, in the preview management table 27d shown in FIG. 4, a preview image associated with a job having a job ID "JOB002" is stored in a server 30 (see FIG. 1) whose computer name is "SERVER" named "○○○, JPEG".

Figure 5:
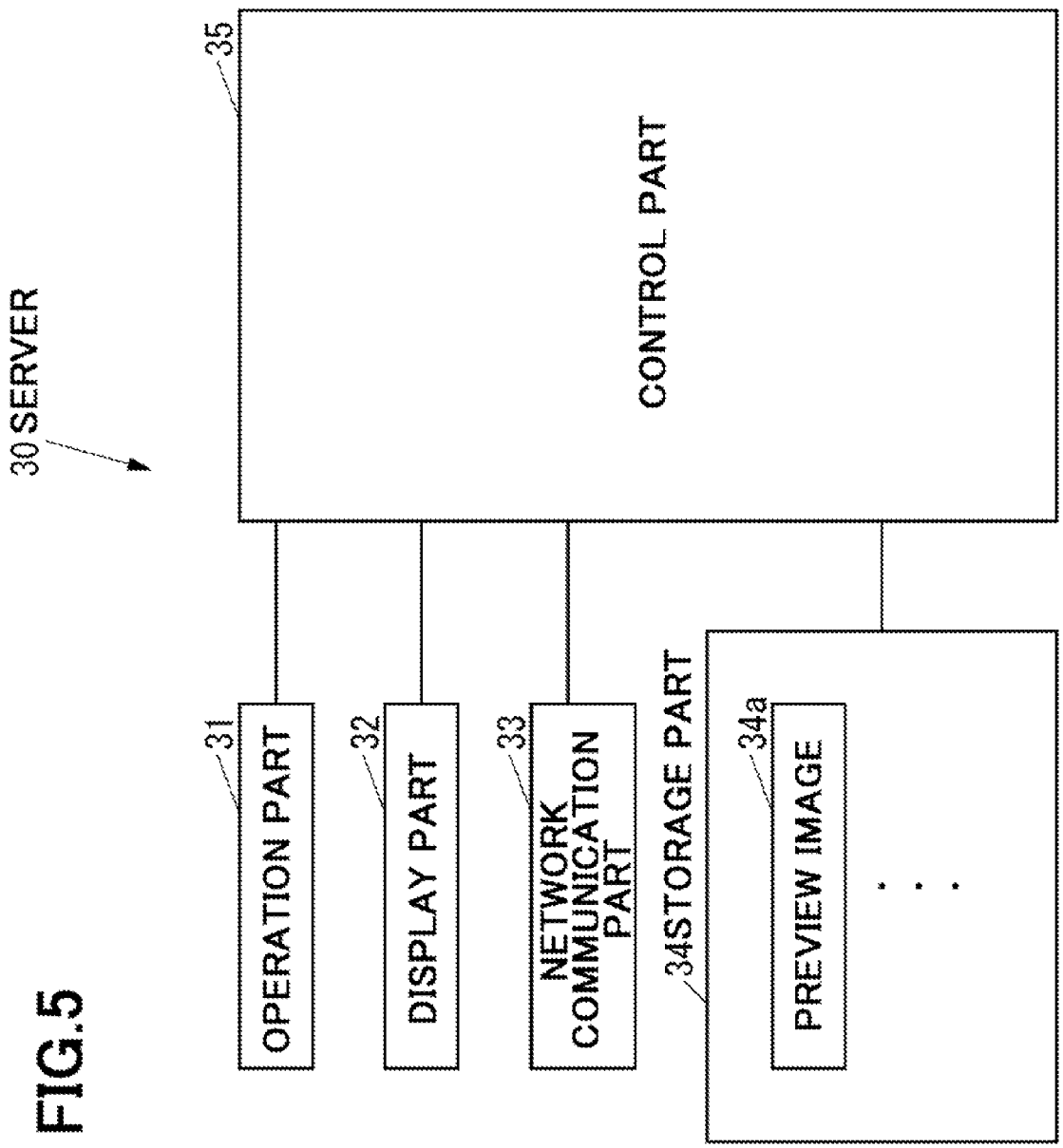
FIG. 5 is a block diagram of a server shown in FIG. 1.

FIG. 5 is a block diagram of the server 30.

As shown in FIG. 5, the server 30 includes an operation part 31 that is an input device such as a button by which a number of operations are input, a display part 32 that is a display device such as a LCD to display a number of information, a network communication part 33 that is a network communication device to perform communication with an external device via the network 11 (see FIG. 1), a storage part 34 that is a nonvolatile memory device such as a HDD in which a program and various data are stored, and a control part 35 that controls the whole server 30.

The storage part 34 is able to store plural preview images 34a for preview of an output image to be output by the MFP 20.

The control part 35 includes, for example, a CPU, a ROM in which a program and various data are stored, and a RAM for use as a work area of the CPU. The CPU executes the program stored in the ROM or the storage part 34.

Figure 6:
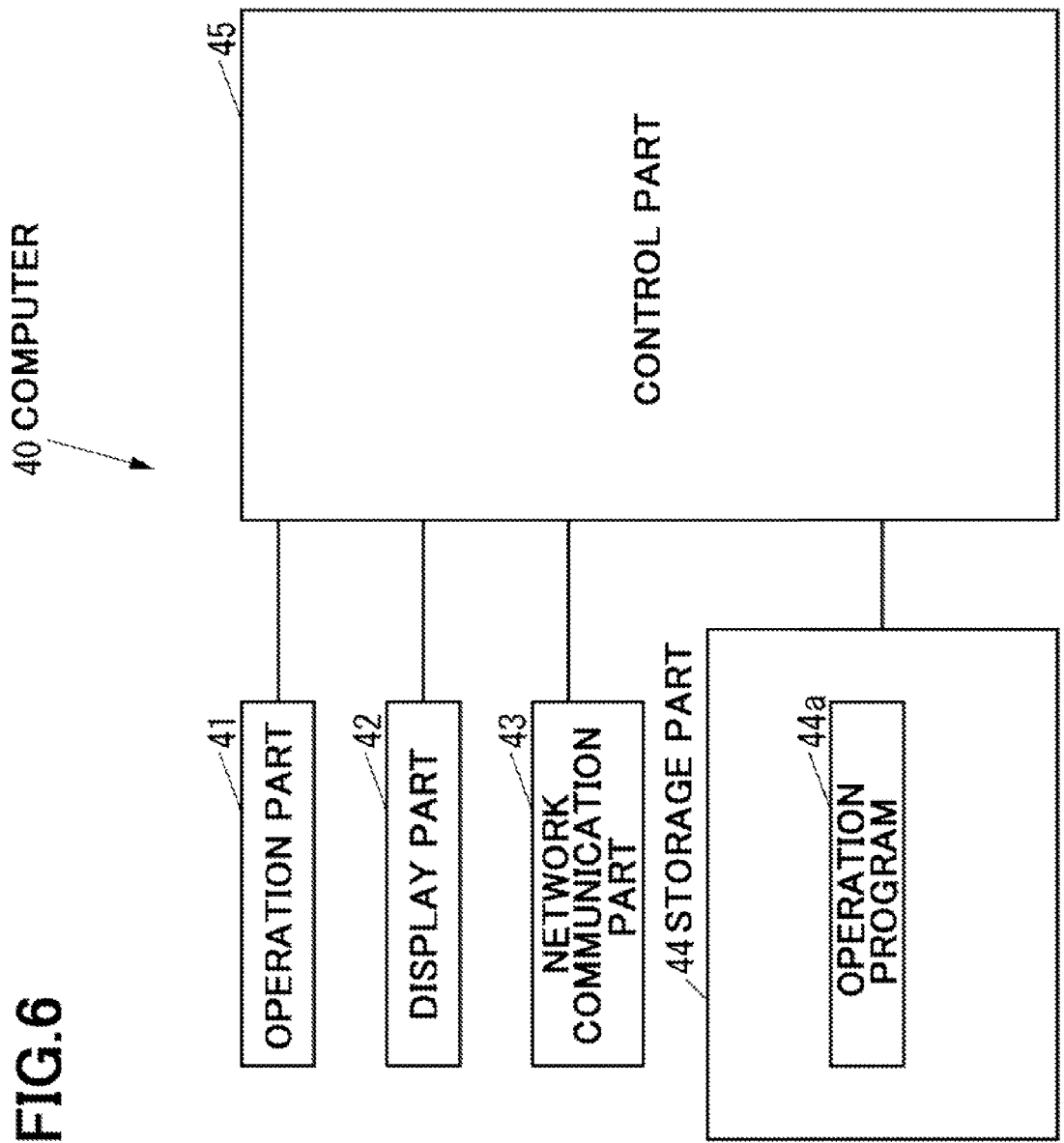
FIG. 6 is a block diagram of a computer shown in FIG. 1.

FIG. 6 is a block diagram of the computer 40.

As shown in FIG. 6, the computer 40 includes an input part 41 that is an input device such as a button by which a number of operations are input, a display part 42 that is a display device such as a LCD to display a number of information, a network communication part 43 that is a network communication device to perform communication with an external device via the network 11 (see FIG. 1), a storage part 44 that is an nonvolatile memory device such as a HDD in which a program and various data are stored, and a control part 45 that controls the whole computer 40.

The storage part 44 stores an operation program 44a to operate the MFP 20 (see FIG. 1). The operation program 44a may be installed in the computer 40 at a manufacturing stage of the computer 40, additionally installed in the computer 40 from an external storage medium such as a SD card and a USB memory, and installed in the computer 40 over the network 11.

The control part 45 includes, for example, a CPU, a ROM in which a program and various data are stored, and a RAM use for as a work area of the CPU. The CPU executes the program stored in the ROM or the storage part 44.

A description will then be given to an operation of the image forming device 10.

First of all, a description will be given to an operation of the MFP 20 in a case where an output job of an image is executed.

Figure 7:
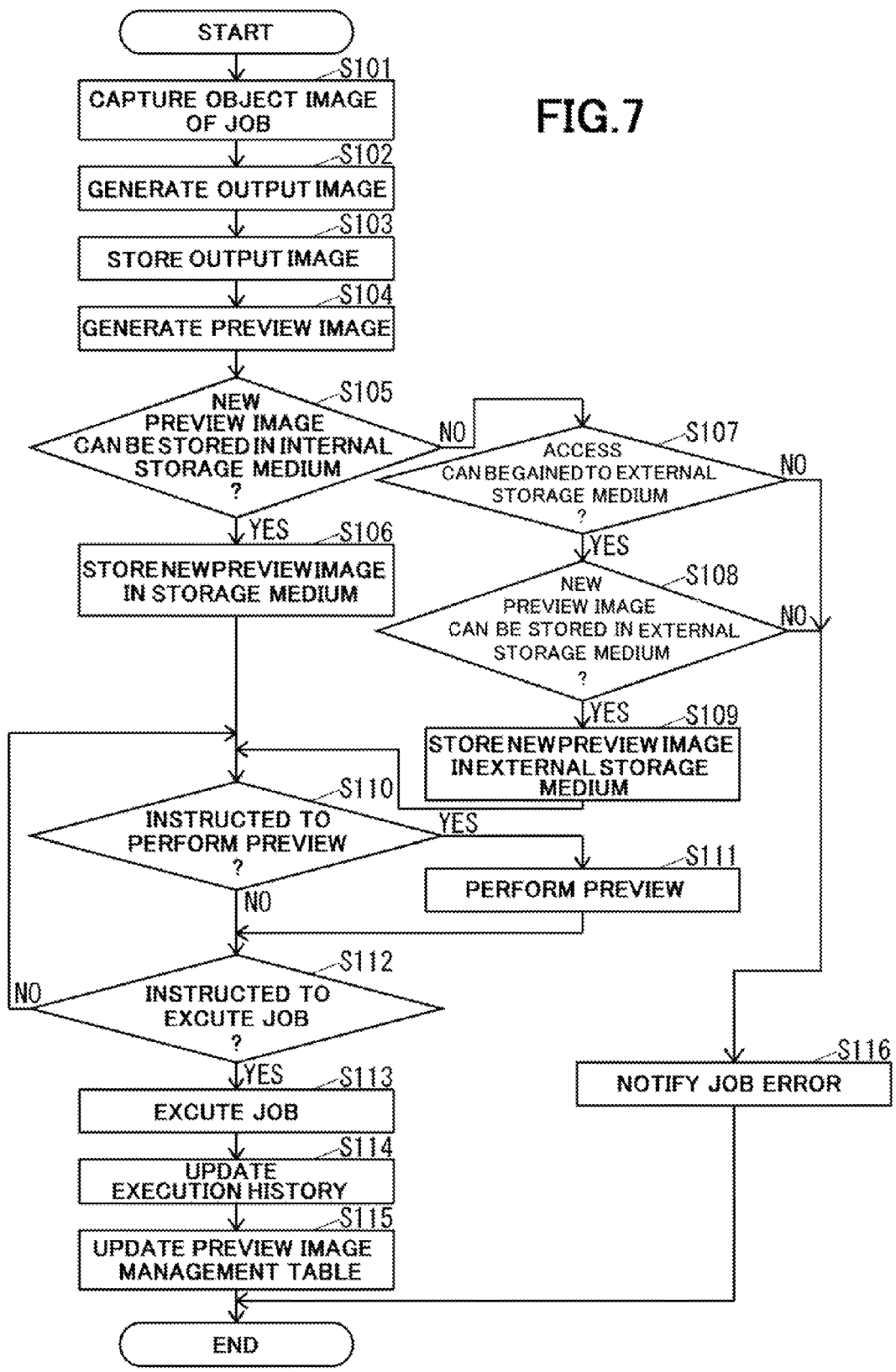
FIG. 7 is a flowchart of an operation of the MFP shown in FIG. 2 when an output job of an image is executed.

FIG. 7 is a flowchart of an operation of the MFP 20 in a case where the output job of the image is executed.

When an instruction to start execution processing of an output job of an image is input from the operation part 21 of the MFP 20 per se, or from the operation part 41 of the computer 40 via the operation program 44a of the computer 40, the control part 28 of the MFP 20 performs an operation shown in FIG. 7.

As shown in FIG. 7, the output image generating means 28a of the MFP 20 captures a target image of an instructed job (hereinbelow referred to as an "instruction job") (S101). For example, the output image generating means 28a captures the target image by reading a document by the scanner 23 if the target image of instruction job is an image read by the scanner 23. Further, the output image generating means 28a captures the image received by the network communication part 26 as a target image if the target image of the instruction image is an image received by the network communication part 26. Furthermore, the output image generating part 28a captures an image read from the external storage medium and the storage part 27 as a target image if the target image of the instruction image is the image read from the external storage medium such as the SD card and the USB memory, and storage part 27.

Next, the output image generating part 28a generates an output image based on the image captured in S101 (S102), and stores the output image generated in S102 in the storage part 27 as the output image 27a (S103).

After that, the preview image generating means 28d generates a preview image based on the image captured in S101 (S104).

Subsequently, the preview image management means 28e determines whether or not a storage medium inside of the MFP 20, that is, a free capacity of the storage part 27 is larger than a size enough to allow the preview image generated in S104 to be stored (S105).

If the preview image management means 28e determines in S105 that the free capacity in the storage part 27 is larger than the size enough to allow the preview image to be stored, the preview image management means 28e stores the preview image generated in S104 in the storage part 27 (S106).

Otherwise, if the preview image management means 28e determines in S105 that the free capacity in the storage part 27 is less than the size enough to allow the preview image to be stored, the preview image management means 28e determines whether or not access can be gained to a storage medium previously specified as an external storage medium of the MFP 20 (S107). Here, as the external storage medium of the MFP 20, it is possible to specify a storage medium such as the server 30 communicable via the network 11 and a storage medium such as the SD card and the USB memory communicable via a connector (not shown) through the operation part 21 or the network communication part 26.

If the preview image management means 28e determines in S107 that access can be gained, the preview image management means 28e determines whether or not the free capacity in the external storage medium which is determined in S107 to be accessible is larger than the size enough to allow the preview image generated in S104 to be stored (S108).

If the preview image management means 28e determines in S108 that the free capacity in the external storage medium is larger than the size enough to allow the preview image to be stored, the preview image management means 28e stores the preview image generated in S104 in the external storage medium (S109).

The preview performing means 28f determines whether or not an instruction to perform a preview is input from the operation part 21 of the MFP 20 per se, or from the operation part 41 of the computer 40 via the operation program 44a of the computer 40 after the processing in S106 or S109 (S110).

If the preview performing means 28f determines in S110 that the instruction to perform the preview is input, the preview performing means 28f reads the preview image stored in the storage medium in S106 or S109, and performs a preview using the read preview image (S111). Here, if an instruction to start the processing shown in FIG. 7 is input from the operation part 21 of the MFP 20, the preview performing means 28f displays a preview using the preview image on the display part 22 of the MFP 20. Otherwise, if the instruction to start the processing shown in FIG. 7 is input from the operation part 41 of the computer 40, the preview performing means 28f displays a preview using the preview image on the display part 42 of the computer 40.

If it is determined in S110 that the instruction to perform the preview is not input, or processing in S111 is executed, the image output means 28b determines whether or not an instruction to execute an instruction job is input from the operation part 21 of the MFP 20 per se, or from the operation part 41 of the computer 40 via the operation program 44a of the computer 40 (S112).

If the preview performing means 28f determines in S112 that the instruction to execute the instruction job is not input, the preview performing means 28f executes the processing in S110.

Otherwise, if the preview performing means 28f determines in S112 that the instruction to execute the instruction job is input, the image output means 28b performs an output via the output image 27a stored in S103 in the storage part 27 (S113). For example, if the instruction job is a copying job or a printing job, the image output means 28b prints in S103 the output image 27a stored in the storage part 27 by the printer 24. Further, if the instruction job is a transmission job by the fax transmission part 25, the image output means 28b transmits the output image 27a stored in S103 in the storage part 27 through the fax transmission part 25. Furthermore, if the instruction job is a transmission job through the network communication part 26, the image output means 28b transmits the output image 27a stored in S103 in the storage part 27 through the network communication part 26.

Then, the history management means 28c includes execution of the instruction job in S113 in the execution history 27c (S114).

Then, the preview image management means 28e includes the preview image stored in S106 or S109 in the storage medium in the preview image management table 27d by associating the preview image with an instruction job included in S114 in the execution history 27c (S115).

If it is determined in S107 not to be accessible, or in S108 that the free capacity in the external storage medium is less than a size enough to allow the preview image to be stored, the image output means 28b notifies an error in the instruction job (S116). Here, if an instruction to start the processing shown in FIG. 7 is input from the operation part 21 of the MFP 20, the image output means 28b displays error notification of the instruction job on the display part 22 of the MFP 20. Otherwise, if the instruction to start the processing shown in FIG. 7 is input from the operation part 41 of the computer 40, the image output means 28b displays error notification of the instruction job on the display part 42 of the computer 40.

The control part 28 ends the processing shown in FIG. 7 after the processing in S115 or S116.

A description will then be given to an operation of the MFP 20 in a case where history is displayed.

Figure 8:
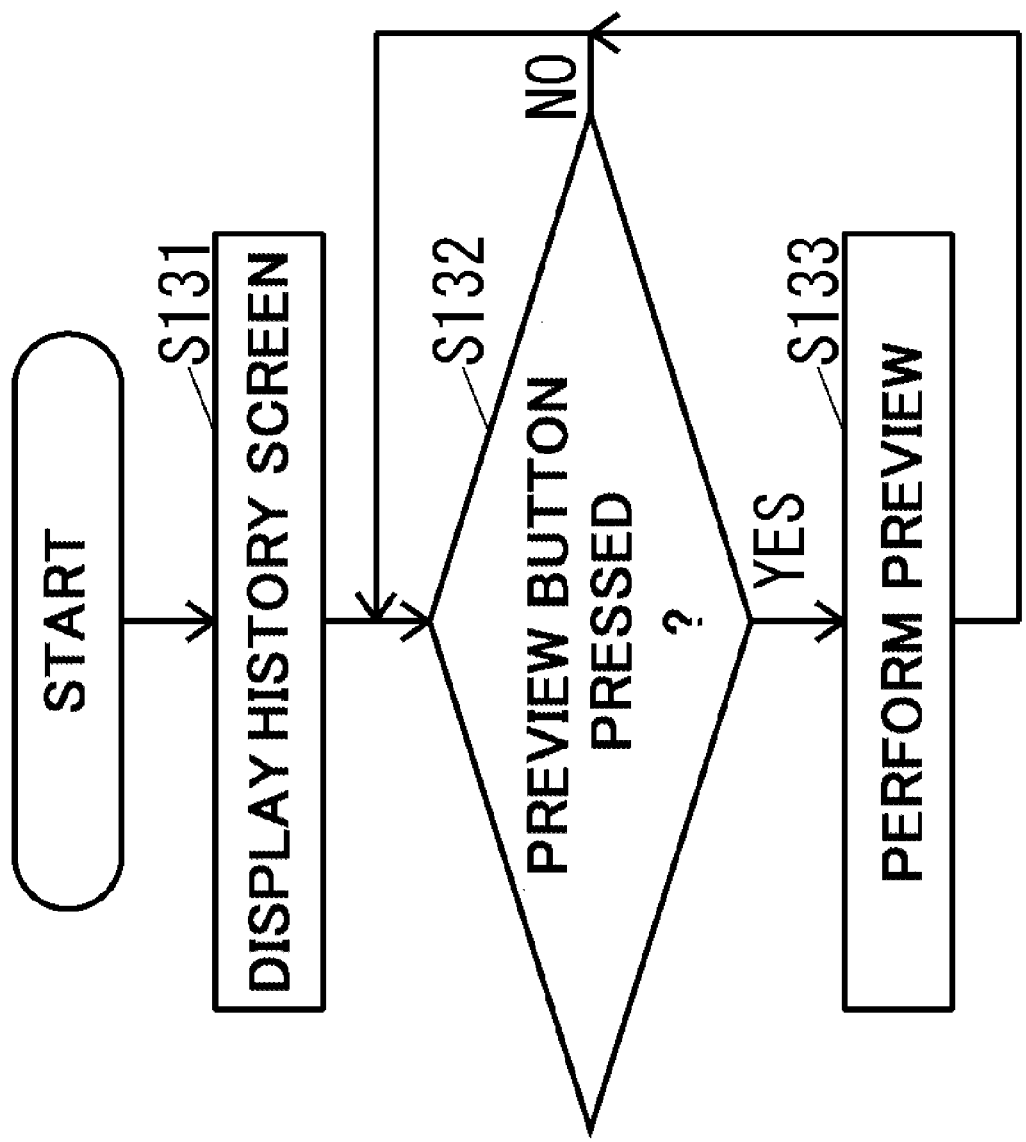
FIG. 8 is a flowchart of an operation of the MFP shown in FIG. 2 when a history is printed.

FIG. 8 is a flowchart of an operation of the MFP 20 in a case where history is displayed.

If an instruction to start display processing of the history is input from the operation part 21 of the MFP 20 per se, or from the operation part 41 of the computer 40 via an operation program 44*a* of the computer 44, the control part 28 of the MFP 20 executes an operation shown in FIG. 8.

As shown in FIG. 8, the history management means 28*c* of the MFP 20 performs display of a history screen showing the history based on the execution history 27*c* (S131). Here, if an instruction to start the processing shown in FIG. 8 is input from the operation part 21 of the MFP 20, the history management means 28*c* displays a history screen on the display part 22 of the MFP 20. Otherwise, if an instruction to start the processing shown in FIG. 8 is input from the operation part 41 of the computer 40, the history management means 28*c* displays a history screen on the display part 42 of the computer 40.

FIG. 9 is a view showing an example of a history screen 50 to be displayed in S131.

The history screen 50 shown in FIG. 9 includes, for each job, a type of a job, date and time of job execution, a preview button 51 for performing a preview. Here, the preview button 51 is included in the history screen 50 by the preview image management means 28*e*. In this connection, the history screen 50 includes only a job history associated with a user ID of a user who is logged in out of jobs included in the execution history 27*c*.

As shown in FIG. 8, the preview performing means 28*f* determines whether or not the preview button 51 is pressed until it is determined that the preview button 51 is pressed after the processing in S131 (S132).

If the preview performing means 28*f* determines in S132 that the preview button 51 is pressed, the preview performing means 28*f* reads a preview image from a path which is associated in the preview image management table 27*d* with a job ID of a job associated with the pressed preview button 51, and performs a preview using the read preview image (S133). Here, if the instruction to start the processing shown in FIG. 8 is input from the operation part 21 of the MFP 20, the preview performing means 28*f* displays a preview using the preview image on the display part 22 of the MFP 20. Otherwise, if the instruction to start the processing shown in FIG. 8 is input from the operation part 41 of the computer 40, the preview performing part 28*f* displays a preview using the preview image on the display part 42 of the computer 40.

The preview performing means 28*f* executes the processing in S132 after the processing in S133.

As described above, since the MFP 20 stores a preview image in the storage medium outside of the MFP 20 (S109), the MFP 20 can store a preview image in the storage medium even if a data size of the preview image is larger (S105:No) to the extent that the preview image 27*b* cannot be stored in the storage part 27 as the storage medium of the MFP 20. Thus, the MFP 20 can perform an appropriate preview (S111).

Note that it is likely that the MFP 20 becomes less able to store the preview image 27*b* in the storage part 27 due to the storage part 27 having a scarce capacity, for example, by the reason of an inexpensive model, or due to lack of the storage part 27 from the beginning. According to the present invention, since the MFP 20 stores the preview image in the storage medium outside of the MFP 20, the invention allows a preview to be performed despite of the inexpensive model.

If it is possible for the preview image 27*b* to be stored in the storage part 27 (S105:YES), the MFP 20 stores the preview image 27*b* in the storage part 27 (S106). Here, it is less likely that the storage part 27 is disconnected from the MFP 20 unlike the storage medium outside of the MFP 20. Accordingly, the MFP 20 can perform an appropriate preview, as compared with a configuration in which a preview image is stored in the storage medium outside of the MFP 20, regardless of whether or not the preview image 27*b* can be stored in the storage part 27.

Alternatively, the MFP 20 may store a preview image in the storage medium outside of the MFP 20, regardless of whether or not the preview image 27*b* can be stored in the storage part 27.

In the MFP 20, the preview image management means 28*e* deletes a preview image from the storage part 27, or from the external storage medium only if an instruction to delete the preview image is received. With this configuration, because the MFP 20 does not delete a preview image from the storage medium unless the MFP 20 receives an instruction to delete the preview image, it is not liable that an old preview image is automatically overwritten in a case where the new preview image is stored in the storage medium. Thus, the MFP 20 allows a user to appropriately confirm the old preview image.

Still alternatively, in a case where the new preview image is stored in the storage medium, the preview image management means 28*e* may automatically overwrite the old preview image in the event that there is no free capacity in the storage medium enough to allow the new preview image to be stored therein.

The preview image in the storage medium is associated with a job in the execution history 27*c*, and hence the MFP 20 allows a user to appropriately confirm a job image which has been executed in the past using the preview image in the storage medium.

In an operation shown in FIG. 7, once it is determined in S107 not to be accessible, or in S108 that the free capacity in the external storage medium is less than the size enough to allow the preview image to be stored, the MFP 20 notifies an error in the instruction job (S116). However, in the operation shown in FIG. 7, if it is determined in S107 not to be accessible, or in S108 that the free capacity in the external storage medium is less than the size enough to allow the preview image to be stored, the MFP 20 may execute an instruction job not to treat it as an error, just by not storing a preview image in the storage medium, and performing a preview based on the preview image.

In the operation shown in FIG. 7, if it is determined in S105 that the free capacity in the storage medium 27 is less than the size enough to allow the preview image of the instruction job to be stored, the MFP 20 stores only the preview image of the instruction job in the external storage medium (S109). Otherwise, if it is determined in S105 that the free capacity in the storage medium 27 is less than the size enough to allow the preview image of the instruction job to be stored, the MFP 20 may store at least part of the preview images 27*b* stored in the external storage medium, in addition to the preview image of the instruction job. Then, the MFP 20 may delete the preview image stored in the external storage medium from the storage part 27, out of the preview images 27*b* stored in the storage part 27.

Figure 10:
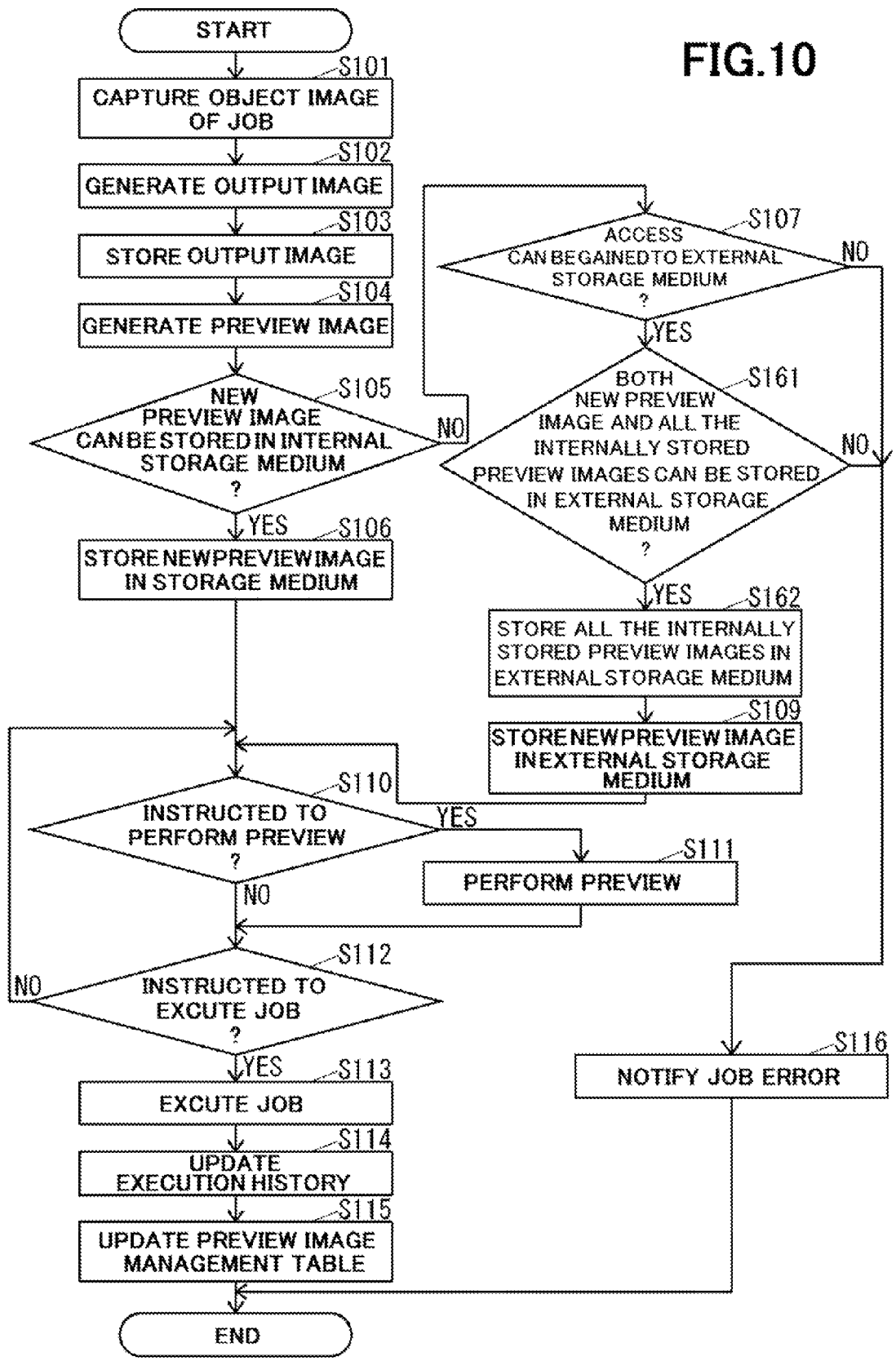
FIG. 10 is a flowchart of an operation of the MFP shown in FIG. 2 when an output job of an image is executed, which shows a different example than that shown in FIG. 7.

For example, as shown in FIG. 10, if the preview image management means 28*e* determines in S107 that access can be gained to the storage medium previously specified as the storage medium outside of the MFP 20, the preview image management means 28*e* determines whether or not the free capacity in the external storage medium determined in S107 to be accessible is larger than the size enough to allow the new preview image generated in S104, and all the preview images 17b stored in the storage part 27 to be stored (S161).

If the preview image management means 28e determines in S161 that the free capacity in the external storage medium is larger than the size enough to allow both the new preview image and all the preview images 27b stored in the storage part 27 to be stored, the preview image management means 28e moves all the preview images 27b stored in the storage part 27 to the external storage medium (S162), and at the same time stores the preview image of the instruction job in the external storage medium (S109).

Otherwise, if the preview image management means 28e determines in S161 that the free capacity in the external storage medium is less than the size enough to allow both the new preview image and all the preview images stored in the storage part 27 to be stored, the output image means 28b notifies an error in the instruction job (S116).

Because the deletion of the preview image 27b from the storage part 27 by moving the preview image 27b stored in the storage part 27 to the external storage medium increases a free capacity in the storage part 27, the MFP20 enables an increase in the number of the output image 27a storable in the storage part 27.

In an operation shown in FIG. 7, if it is determined in S105 that the free capacity in the storage part 27 is less than the size enough to allow the preview image of the instruction job to be stored, the MFP 20 stores the preview image of the instruction job in the external storage medium (S109). However, even in a case where if it is determined in S105 that the free capacity in the storage part 27 is less than the size enough to allow the preview image of the instruction job to be stored, the MFP 20 may store the preview image of the instruction job in the storage part 27 after the preview image 27a stored in the storage part 27 moves to the external storage medium so that the free capacity in the storage part 27 becomes larger than the size enough to allow the preview image of the instruction job to be stored.

For example, as shown in FIG. 11, if the preview image management means 28c determines in S107 to be accessible to the storage medium previously specified as a storage medium outside of the MFP 20, the preview image management means 28e determines whether or not a total size of the preview images 27a stored in the storage part 27 is larger than the size enough to allow the new preview image generated in S104 to be stored (S191).

If the preview image management means 28e determines in S191 that the total size of the preview images 27a stored in the storage part 27 is larger than the size enough to allow the new preview image to be stored, the preview image management means 28e determines the preview image 27a to be moved to the external storage medium which is determined in S107 to be accessible, out of the preview images 27a stored in the storage part 27 (S192).

Then, the preview image management means 28e determines whether or not the free capacity in the external storage medium which is determined in S107 to be accessible is larger than the total size of the preview image determined in S192 (S193).

If the preview image management means 28e determines in S193 that the free capacity in the external storage medium is larger than the total size of the preview images, the preview image management means 28e moves the preview image determined in S192 from the storage par 27 to the external memory medium (S194), and stores the preview image generated in S104 in the storage part 27 (S106).

If it is determined in S191 that the total size of the preview image 27a stored in the storage part 27 is less than the size enough to allow the new preview image to be stored, or determined in S193 that the free capacity in the external storage medium is less than the total size of the preview images, the image output means 28b notifies an error in the instruction job (S116).

Since the MFP 20 can store the new preview image in the storage part 27 (S106), even in a case where the free capacity in the storage part 27 is less than the size enough to allow the new preview image to be stored (S105:No), the MFP 20 enables an appropriate preview to be performed (S111) using the preview image 27a stored in the storage part 27, not in the external storage medium.

Alternatively, when the preview image 27a stored in the storage part 28 moves in S194 to the external storage medium so that the free capacity in the storage part 27 becomes larger than a size enough to allow the new preview image to be stored, the preview image management means 28e may choose in S192 the preview image 27a to be moved so that a total size of the preview image 27a to be moved becomes minimum. With this configuration, since the MFP 20 does not move the preview image 27a more than necessary from the storage part 27 to the external storage medium, the MFP 20 enables an appropriate preview to be performed (S111) using the preview image 27a stored in the storage part 27, not in the external storage medium.

Still alternatively, when the preview image 27a stored in the storage part 27 moves in S194 to the external storage medium so that a free capacity in the storage part 27 becomes larger than a size enough to allow a new preview image to be stored, the preview image management means 28e may choose in S192 the preview image 27a to be moved which is stored in the storage part 27 in ascending order by time. With this configuration, the MFP 20 preferentially moves "the old preview image" which is often less likely to be used, as compared with "the new preview image", from the storage part 27 to the external storage medium (S194), thereby preferentially leaving "the new preview image" in the storage part 27. This allows an appropriate preview to be performed using the preview image 27a stored in the storage part 27, not in the external storage medium (S111).

In this connection, the MFP 20 communicates an instruction from the computer 40 and an image to be displayed on the computer 40 via the operation program 44a of the computer 40. Alternatively, without sticking this, the MFP 20 may implement communication of an instruction from the computer 40 and an image to be displayed on the computer 40 by a method other than the operation program 44a. For example, the MFP 20 may create a Web page for communication of an instruction from the computer 40 and an image to be displayed on the computer 40, and communicate with the computer 40 via the Web page.

While the image forming device according to the present invention is the MFP in the present embodiment, the image forming device may be an image forming device other than the MFP, such as a special purpose copying machine, a special purpose printing machine, a special purpose facsimile machine, and a special purpose scanner, or the like.

The invention claimed is:

1. An image forming device comprising:
an output image generating part that generates an output image for output of at least one of transmission and printing;
an image output part that executes the output using the output image generated by the output image generating part;

a preview image generating part that generates a preview image for preview of the output image;

a preview image management part that stores the preview image generated by the preview image generating part in a storage medium; and a preview performing part that executes the preview using the preview image stored in the storage medium, wherein the image forming device comprises a first storage medium inside the image forming device that stores preview images, wherein the preview image management part stores a new preview image in the first storage medium inside of the image forming device if a free capacity of the first storage medium is larger than a size large enough to allow the new preview image to be stored, and wherein the preview image management part, if the free capacity in the first storage medium is less than the size large enough to allow the new preview image to be stored and if a free capacity in a second storage medium outside of the image forming device is larger than the size large enough to allow storage of the new preview image and at least part of the preview images stored in the first storage medium, stores the new preview image in the second storage medium outside of the image forming device and moves the at least part of the preview images stored in the first storage medium to the second storage medium.

2. The image forming device according to claim 1, wherein the preview image management part deletes the preview image from the storage medium only if an instruction to delete the preview image is received.

3. The image forming device according to claim 1, further comprising a history management part that manages an execution history of the output job by the image output part, and wherein the preview image management part associates the preview image in the storage medium with the output job in the execution history.

4. An image forming device comprising:

an output image generating part that generates an output image for output of at least one of transmission and printing;

an image output part that executes the output using the output image generated by the output image generating part;

a preview image generating part that generates a preview image for preview of the output image;

a preview image management part that stores the preview image generated by the preview image generating part in a storage medium; and a preview performing part that executes the preview using the preview image stored in the storage medium, wherein the image forming device comprises a first storage medium inside the image forming device that stores preview images, wherein the preview image management part stores a new preview image in the first storage medium inside of the image forming device if a free capacity of the first storage medium is larger than a size large enough to allow the new preview image to be stored, and wherein the preview image management part moves a preview image stored in the first storage medium inside of the image forming device to a second storage medium outside of the image forming device so that, following the move, the free capacity in the first storage medium inside of the image forming device is larger than the size large enough to allow the new preview image to be stored if the free capacity in the first storage medium inside of the image forming device is less than the size large enough to allow the new preview image to be stored, wherein the preview image to be moved is chosen for said move such that the total size of the preview image to be moved to the second storage medium from the first storage medium is minimized, and then the preview image management part stores the new preview image in the first storage medium.

5. The image forming device according to claim 4, wherein the preview image management part chooses the preview image to be moved so that a total size of the preview image to be moved becomes minimum if the preview image stored in the first storage medium moves to the second storage medium such that the free capacity in the first storage medium becomes larger than the size enough to allow the new preview image to be stored.

6. The image forming device according to claim 4, wherein the preview images are stored in the first storage part by ascending order by time and wherein the preview image management part preferentially chooses, as the preview image to be moved, a preview image which is older among the preview images, if the preview image stored in the first storage medium moves to the second storage medium so that the free capacity in the first storage medium is larger than the size large enough to allow the new preview image to be stored.

7. The image forming device according to claim 4, wherein the preview image management part moves the preview image stored in the first storage medium to the second storage medium only if a total size of the preview image stored in the first storage medium is larger than a size large enough to allow the new preview image to be stored.

* * * * *